United States Patent Office.

JOHN C. CROSMAN AND OBADIAH MARLAND, OF BOSTON, MASSACHUSETTS, ASSIGNORS TO THEMSELVES AND ALFRED E. TILTON, OF NEW YORK CITY.

Letters Patent No. 97,889, dated December 14, 1869.

IMPROVEMENT IN TREATING WHISKEY AND OTHER ALCOHOLIC SPIRITS.

The Schedule referred to in these Letters Patent and making part of the same.

*To all whom it may concern:*

Be it known that we, JOHN C. CROSMAN and OBADIAH MARLAND, both of Boston, in the county of Suffolk, and State of Massachusetts, have invented an Improvement in Treating Whiskey, &c.; and we do hereby declare that the following is a description of our invention sufficient to enable those skilled in the art to practise it.

It is well known that heretofore, in "ripening" or "ageing" whiskey, or other liquor containing alcohol, it has been the custom to lay it away in attics heated by the sun, or in rooms artificially warmed by steam, where it is kept for years, or for months, according to the degree of "age" it is desired to impart to it.

When said whiskey is laid away in wooden vessels, to "ripen" or to become "old," (and it is almost always laid away in barrels or casks,) it is well known that it loses a considerable percentage in quantity, and that it also loses a considerable amount of its original strength, or "proof," as the most volatile portions of said whiskey are constantly escaping.

Our invention consists in subjecting, to the action of heat, whiskey or other alcoholic liquid, contained in a steam-tight digester, which digester may be made of metal, glass, or other suitable or suitably-lined material, the liquor being preferably raised to about 232° temperature, Fahrenheit, and maintained at such temperature for about eight and a half hours.

This digester may be made of any desired capacity, and is to be perfectly tight, and is provided with a man-hole and large stop-cock, through which the liquor to be treated is passed into, and drawn or pumped off from said digester.

The digester may also be provided with a safety-valve, and with a jacket, for the purpose of heating it with steam.

A thermometer may be connected, in the usual way, with said jacket, for the purpose of indicating the degree of heat applied, and we prefer to use, also, a steam-gauge, in connection with said jacket, to denote the pressure of steam employed.

We have sometimes lined the inner surface of said digester with a coating of platinum, and sometimes with a coating of silver, (by electro-deposition of said metals,) but we have obtained very satisfactory results with an ordinary "tinned" surface on a digester of bronze.

We prefer making such digester cylindrical in form, and about five times the length of its diameter.

In charging the digester with the liquor to be treated, we prefer to fill it only to about two-thirds of its capacity, leaving the remaining space to be occupied by vapor and air.

After putting a charge of whiskey or other liquor into the digester, and making the digester steam-tight, we let steam in between said jacket and digester, until the digester and its contents are heated to the temperature desired, which temperature we maintain for a suitable length of time.

We have heated whiskey for a less time than one hour, at a temperature only one degree above its boiling-point, and found its flavor sensibly improved, or "aged;" and we have heated whiskey at various temperatures, from below a boiling-point upward to 265° Fahrenheit, maintaining the heat at the degree of temperature to which it was raised, for various lengths of time, from one hour to twenty-four hours. In each treatment, the change in flavor was perceptible. And now, after some months of experimenting to obtain the best results, we prefer to subject the liquor, as before set forth, to the action of a temperature of about 232° Fahrenheit, and to keep it at that temperature for about eight and a half hours.

When heated to a much higher temperature, and kept heated for a greater length of time, it has been pronounced "overdone" or "overcooked;" and at a less temperature, with less time, it was pronounced comparatively "raw" or "underdone."

We have heated the fermented wash, before distilling, with results very similar to those attending the heating of the distillate, of "proof" strength.

We have also, by connecting a jacketed retort with a condenser, and the bottom of said condenser, by a pipe, with the bottom of said retort, distilled over and over again, under a degree of heat high above its boiling-point, the same parcel of whiskey, until it was pronounced "old" or "well cooked."

The advantages of our invention, over all preceding processes used for the same purpose, are that the time required to attain the desired result is comparatively very short, there is no loss from "shrinkage" in the quantity of liquor treated, and no loss in the degree of "proof" or strength of said liquor.

As the pressure from the vapor of heated alcohol is about one hundred and fifteen per cent. greater than the pressure from the vapor of water heated to the same temperature, it is necessary (when a high heat is used) to make said digester much stronger than if water alone were to be heated in it.

From this description it will be seen that the essential feature of our invention consists in subjecting liquor contained in a steam-tight vessel to the action of heat, the liquor being in bulk, and not in a state of division, and being preferably heated to the temperature and for the length of time described.

We claim the improvement in treating whiskey and other liquors, substantially as described.

Executed November 10, 1869.

JOHN C. CROSMAN.
OBADIAH MARLAND.

Witnesses:
FRANCIS GOULD,
S. B. KIDDER.